2,852,493

UREIDO-MODIFIED POLYMERS AND THEIR PREPARATION

Donald A. Smith and Cornelius C. Unruh, Rochester, N. Y., assignors to Eastman Kodak Company, Rochester, N. Y., a corporation of New Jersey No Drawing. Application December 24, 1953
Serial No. 400,374

12 Claims. (Cl. 260—77.5)

This invention relates to modified polymeric materials and is particularly concerned with modified polymers containing ureido substituent groups which make the polymers capable of being hardened by formaldehyde, and hence useful as gelatin substitutes in photographic processes.

At the present time gelatin is widely used as the carrier layer for light-sensitive photographic emulsions such as silver halide emulsions. This gelatin layer is hydrophilic and is capable of being hardened by formaldehyde. It is desirable, however, to be able to prepare synthetic compounds which can be used in place of gelatin in such photographic processes, as emulsion addenda or similar uses. Many of the polymeric materials are quite hydrophobic and hence are completely unsuitable for this purpose. Some of the polymers such as the partially hydrolyzed cellulose and polyvinyl polymers containing functional hydroxyl groups have the necessary hydrophilic characteristics but are incapable of being hardened by formaldehyde. It is necessary, of course, that the carrier layer be capable of being hardened following development of the photographic film. As a consequence the provision of synthetic gelatin substitutes has been a difficult problem.

It is accordingly an object of this invention to provide a new class of modified polymeric materials which can serve as gelatin substitutes in photographic processes. It is also an object of this invention to provide ureido derivatives of polymeric materials which are capable of being hardened by formaldehyde. Another object of the invention is to provide a simple method for modifying the properties of well known polymeric materials in order to give products which are hydrophilic but which can be hardened during the photographic process. Another object of the invention is to provide a new group of derivatives of hydroxyl-containing cellulose and polyvinyl polymers. Other objects will be apparent from the description and claims which follow.

These and other objects are attained by means of this invention as described more fully hereinafter with particular reference to certain preferred embodiments thereof. The hydroxyl-containing polymeric materials which are modified in accordance with this invention can be any of the well known hydroxyl-containing polymers. Thus, for example, the polymeric materials containing a plurality of recurring alkylene groups, including the poly alkylidene polymers, whether in the form of the alcohol or partially esterified or etherified, can be employed in practicing the invention. Hydrolyzed alkylene ester polymers and copolymers can also be used, as well as carbohydrate polymers such as starch, cellulose, glycogen, and the like. Partially esterified or etherified carbohydrate polymers are also eminently suited for modification in accordance with this invention. Typical hydroxyl polymers suitable for use in practicing this invention include, but are not limited to, polyvinyl alcohol, partially hydrolyzed polyvinyl acetate and polyvinylidene acetate or copolymers thereof, polyvinyl butyral compositions containing polyvinyl alcohol, cellulose, starch, glycogen, incompletely hydrolyzed cellulose ethers such as cellulose methyl ether, cellulose ethyl ether and the like, incompletely esterified cellulose esters such as cellulose acetate, cellulose butyrate and the like having any degree of acylation less than complete acylation, and similar hydroxyl polymers, including hydroxy ethyl cellulose and hydorlyzed copolymers of vinyl acetate with other polymerizable monomers such as ethylene.

These and similar hydroxyl-containing polymers are modified in accordance with this invention by reacting such polymers with a ureido compound of the formula

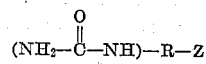

wherein the bracketed portion is the ureido group and wherein R is either an alkylene or an arylene group and desirably a lower alkylene group containing from about 1 to 8 carbon atoms and Z is a functional group which is reactive with the functional hydroxyl group of the polymer. Thus the ureido compound can be a ureido alkylene or arylene isocyanate, aldehyde, acetal, ester or amine. In the process embodying this invention, the functional group of the ureido compound reacts with the functional hydroxyl groups of the polymer being modified to give polymers containing the group

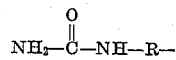

joined to the polymer chain by means of a carbamyl, acetal, ester or amide linkage. These ureido groups spaced along the polymer chain greatly modify the properties of the polymers. They make the polymers hydrophilic whereby they can be swelled with water and also are capable of reacting with formaldehyde to give hardened polymers. In practicing the invention, any of the functional ureido compounds can be employed, but the ureido compounds are conveniently ureido isocyanates of the formula

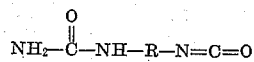

wherein R is an alkylene or arylene group as described hereinabove and desirably a $—(CH_2)_n$-group where $n$ is a number from 1 to 8. When such ureido isocyanates are employed, the polymer contains a plurality of groups of the formula

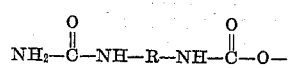

spaced along the polymer chain.

The preparation of the ureido-modified polymers in accordance with this invention is effected by reacting the ureido compound with the hydroxyl-containing polymer at an elevated temperature. The reaction temperature can be varied in accordance with well known practices, but it is desirably about 60–150° C. The reaction is desirably effected with the polymers in solution in a suitable organic solvent such as dioxane, or similar well known organic solvent; although the reaction can be effected without the use of a solvent, particularly when one of the reactants is liquid. In many cases the reaction is effected using equimolar proportions of the reactants, although an excess of either reactant can be employed up to as much as ten times the stoichiometric amount, depending upon the degree of modification desired, the degree of hydrolysis of the polymers, the reaction conditions, and similar well known variable factors. When a solvent is employed, the reaction can be effected at any temperature up to the reflux temperature of the solvent or higher, depending upon the reaction time desired. The limiting temperature is, of course, the temperature at which the polymer is adversely affected by the heating. The reaction ordinarily can be effected in a period of from 0.5 to 2 hours, although longer or shorter times can be employed. In some cases, the reaction proceeds to completion immediately upon mixing the reactants, particularly in hot solvent.

In practicing this invention a modified polymer having any degree of modification desired can be obtained by employing a polymer which contains a greater or lesser amount of functional hydroxyl groups. Thus, for example, by employing a cellulose or polyvinyl polymer which contains relatively few hydroxys only a few ureido groups are introduced into the polymer, and hence the properties will be modified less than when employing a polymer having a high proportion of hydroxyl groups whereby a large number of ureido groups are introduced into the polymer, and the properties are changed drastically from the original properties of the polymer. The ureido-modified polymers embodying this invention are suitably employed as carriers for the photosensitive silver halide emulsions used in the photographic industry, or for use as extenders or addenda in these or other emulsions wherein hydrophilic organic compounds are desired. The products can be cast into continuous films from solution in a suitable solvent in accordance with well known practice, and such films can be used directly or can be hardened with formaldehyde whereby the hardened film can be used as a support layer for photographic films or the like. The products embodying this invention can, of course, be used in both black-and-white or color photographic films. In preparing these products, either a batchwise or a continuous process can be used in accordance with the usual chemical practice.

The invention is illustrated by the following examples of certain preferred embodiments thereof. It will be understood, however, that these examples are included to illustrate the best mode of practicing the invention and are not intended to limit the scope of the invention as herein defined, unless otherwise indicated.

*Example 1*

A suspension of 44.0 g. of polyvinyl alcohol in 250 ml. of dry dioxane was mixed with 9.0 g. of 6-ureidohexyl isocyanate and the resulting mixture was heated on the steam bath and stirred for 90 minutes. The solid polymer was filtered out of the hot mixture, and this solid was washed with dioxane, dissolved in hot water, filtered, and precipitated in acetone. This ureidohexyl carbamate of polyvinyl alcohol contained 1.4% nitrogen, and was of considerable utility as a gelatin substitute. The polymer is soluble in hot water and can be hardened by formaldehyde.

*Example 2*

To a solution of 22 g. of polyvinyl alcohol in 200 ml. of hot dimethylformamide was added 5 g. of 6-ureidohexamethylene isocyanate in 50 ml. of dimethylformamide. The resulting mixture was heated for a few minutes below the boiling point and then poured hot into a large volume of acetone. The resulting precipitate was separated out, dissolved in 200 ml. of hot water, and again precipitated into acetone, washed and dried to give 19 g. of modified polymer containing 2.4% of nitrogen. As can be seen, the reaction proceeds with unusual facility whereby the reaction time can be as little as a few minutes.

*Example 3*

As described herein, the amount of the ureido compound can be varied over wide limits. Thus, for example, a solution of 22 g. of polyvinyl alcohol was reacted with 2 g. of 6-ureido hexamethylene isocyanate in 250 ml. of dimethylformamide. The product was precipitated out in acetone and purified in the usual manner to give 17 g. of ureido-hexamethylene carbamate of the polyvinyl alcohol having a nitrogen content of 1.7%.

*Example 4*

A more highly modified derivative of polyvinyl alcohol was prepared as in the preceding example using 10 g. of the ureido isocyanate with 22 g. of polyvinyl alcohol. In this case a much larger percentage of the free hydroxyl groups of the polyvinyl alcohol were reacted with the ureido compound, whereby 10 g. of product was obtained having a nitrogen content of 4.0%.

*Example 5*

The invention is equally applicable for treating polyester polymers which have been partially hydrolyzed so as to to contain a substantial proportion of reactive hydroxyl groups. Thus a solution of 19.5 g. of polyvinyl acetate (19.5% acetyl) in 200 ml. of hot dimethylformamide was heated together with 5 g. of 6-ureidohexamethylene isocyanate for a few minutes at a temperature below the boiling point of the solution. The modified polymer was then precipitated in acetone, dissolved in hot water and reprecipitated into acetone to give 20 g. of ureido-hexamethylene carbamate of polyvinyl acetate having a nitrogen content of 3.7%.

*Example 6*

Similar results are obtained by modifying any of the other hydroxyl-containing polymers as described herein. Thus a solution of 20 g. of cellulose acetate (20.3% acetyl) in 200 ml. of dimethylformamide was treated with 16 g. of 6-ureidohexyl isocyanate dissolved in 20 ml. of dimethylformamide. The reaction mixture was heated and stirred just below the boiling point for one hour. The mixture was then cooled and the modified polymer precipitated in methanol. This ureidohexyl carbamate of cellulose acetate was washed repeatedly with methanol and dried to give 22.7 g. of product, having a nitrogen content of 3.7%.

*Example 7*

Partially etherified polymeric materials are also useful in practicing this invention. For example, 15 g. of 6-ureidohexyl isocyanate was added to a hot solution of 10 g. of ethyl cellulose (38.2% ethoxyl) in 100 ml. of dimethylformamide. The resulting solution was stirred for 90 minutes near its boiling point and then poured hot into a large volume of water. The resulting precipitated product was washed repeatedly with water and dried at 40° C. to give 11.8 g. of modified polymer having a nitrogen content of 4.7%.

Similar results are obtained with other hydroxyl-containing polymers as described herein and with this and other ureido compounds containing a functional group which is reactive with the function hydroxyl group of the polymers. The nature of the linkage is not of particular importance since it is the ureido groups which serve to modify the properties of the polymer. Thus, by means of this invention, a highly useful group of modified polymers is readily prepared in a simple and straightforward process, and modified polymers which can be used for applications in which the polymers themselves are completely unsuitable are obtained.

Although the invention has been described in considerable detail with particular reference to certain preferred embodiments thereof, it will be understood that variations and modifications can be effected within the spirit and scope of the invention as described hereinabove and as defined in the appended claims.

We claim:
1. A ureido alkyl carbamate of an at least partially hydrolyzed vinyl ester polymer.
2. A ureido alkyl carbamate of a cellulose polymer.
3. A 6-ureidohexyl carbamate of an at least partially hydrolyzed vinyl ester polymer.

4. A 6-ureidohexyl carbamate of a cellulose polymer.

5. The method which comprises reacting an at least partially hydrolyzed vinyl ester polymer containing a plurality of functional hydroxyl groups with a ureido polymethylene isocyanate at a temperature of 60–150° C. and thereby forming a ureido polymethylene carbamate of said vinyl polymer.

6. The method which comprises reacting a cellulose polymer containing a plurality of functional hydroxyl groups with a ureido polymethylene isocyanate at a temperature of 60–150° C. and thereby forming a ureido polymethylene carbamate of said cellulose polymer.

7. The method which comprises reacting at 60–150° C. a hydroxyl-containing polymer from the group consisting of polyvinyl alcohol, at least partially hydrolyzed polyvinyl esters, partially hydrolyzed cellulose ethers, cellulose, and incompletely esterified cellulose esters with a compound of the formula

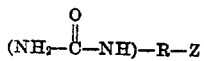

wherein R is selected from the group consisting of alkylene and arylene groups and Z is an isocyanate group.

8. As a new compound, a member of the group consisting of ureido alkyl carbamates and ureido aryl carbamates of a hydroxyl containing polymer selected from the group consisting of polyvinyl alcohol, at least partially hydrolyzed polyvinyl esters, partially hydrolyzed cellulose ethers, cellulose and incompletely esterified cellulose esters.

9. A ureido alkyl carbamate of polyvinyl alcohol.

10. A ureido alkyl carbamate of a partially hydrolyzed polyvinyl ester.

11. A ureido alkyl carbamate of a partially hydrolyzed cellulose ester.

12. A ureido alkyl carbamate of a partially hydrolyzed cellulose ether.

References Cited in the file of this patent

UNITED STATES PATENTS

| | | |
|---|---|---|
| 2,220,508 | Bock | Nov. 5, 1940 |
| 2,647,884 | Wystarch | Aug. 4, 1953 |
| 2,680,730 | Martin | June 8, 1954 |
| 2,683,727 | Mastin et al. | July 13, 1954 |

OTHER REFERENCES

Speel: Textile Chemicals and Auxiliaries, Reinhold, 1952, pp. 364 and 365. (Copy in Scientific Library.)